No. 614,808.  
J. V. HAWKEY.  
LUBRICATING CAR WHEEL.  
(Application filed Dec. 31, 1897.)  
(No Model.)

Patented Nov. 22, 1898.

Witnesses:  
Richard S. Harrison  
William J. Haworth

Inventor  
John V Hawkey  
Per  
O D Lewis  
his Att'ys

THE NORRIS PETERS CO., PHOTO-LITHO., WASHINGTON, D. C.

UNITED STATES PATENT OFFICE.

JOHN V. HAWKEY, OF GREENSBURG, PENNSYLVANIA.

LUBRICATING CAR-WHEELS.

SPECIFICATION forming part of Letters Patent No. 614,808, dated November 22, 1898.

Application filed December 31, 1897. Serial No. 665,089. (No model.)

*To all whom it may concern:*

Be it known that I, JOHN V. HAWKEY, a citizen of the United States, residing at Greensburg, in the county of Westmoreland and State of Pennsylvania, have invented certain new and useful Improvements in Lubricating Car-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to car-wheels; and its object is to provide an improved construction of the same, whereby lubricating material is supplied to the axle or spindle, which has its bearing in the hub of the wheel, in an efficient manner.

The invention consists in the novel construction and combination of parts hereinafter fully described and claimed.

Figure 1:
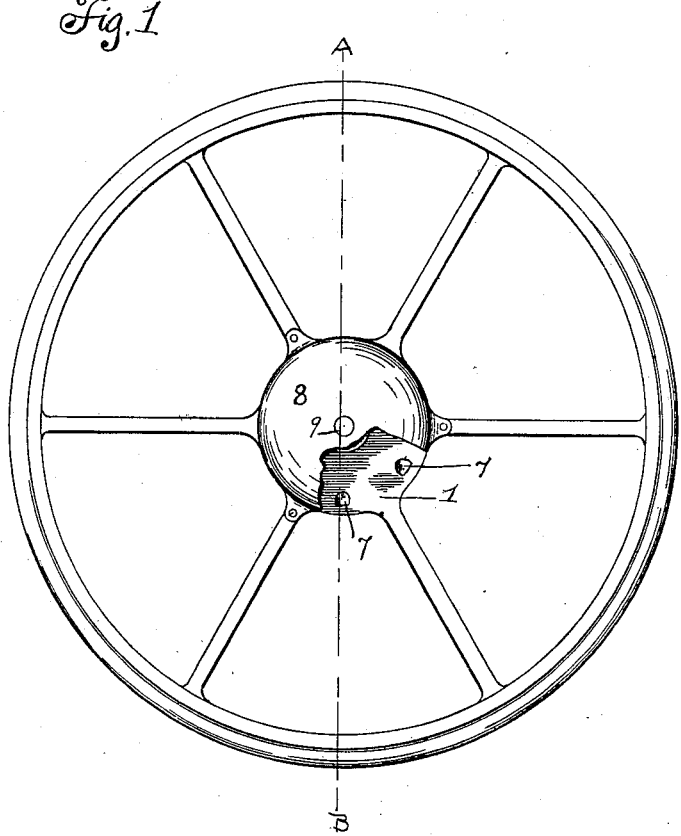
Figure 2:
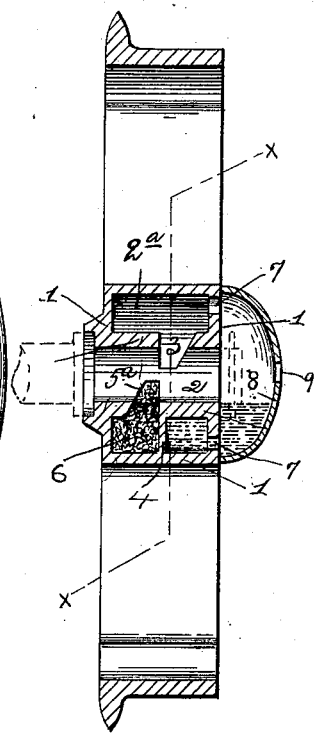
Figure 3:
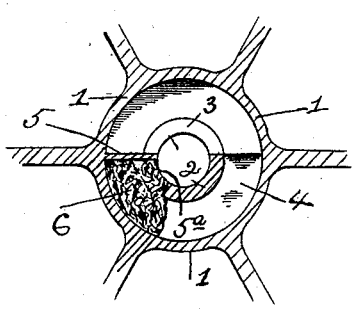

In the accompanying drawings, Figure 1 is an elevation of a car-wheel constructed in accordance with my invention. Fig. 2 is a central transverse section of the same. Fig. 3 is a longitudinal section on the line $x\ x$ of Fig. 2, being partly broken away to show the waste-packing.

In the said drawings the reference-numeral 1 designates the hub of the wheel, formed with the usual cylindrical bearing 2. This hub is made hollow or formed with an annular chamber $2^a$, surrounding the central portion or bearing.

The numeral 3 designates a semicircular opening establishing communication between said chamber and bearing. Opposite said opening is a semicircular partition 4, dividing one-half of said chamber into two compartments, one of which is an oil-receptacle, and the other contains waste-packing 6. The bearing 2 is also provided with a web or partition 5 at a right angle to the partition 4, and the bearing is formed with an opening $5^a$, communicating with the chamber containing the waste-packing 6.

On the outside of the hub is an oil-cup 8, provided with an opening 9 to receive lubricating material. The numeral 7 designates openings communicating with the oil-cup and the oil-receptacle in the hub.

In use the oil is placed in the oil-cup and as the wheel revolves will escape into the oil-receptacle in the hub and from thence through the opening 3 to the bearing 2, a portion of the oil being gradually absorbed by the packing 6, so that it will serve as a lubricating means after the oil in the balance of the hub is exhausted.

Having described my invention, I claim—

In a car-wheel, the combination with the hub, formed with a central bearing and an annular chamber extending around said bearing and said bearing formed with a semicircular opening communicating therewith, the semicircular partition dividing one-half of said chamber into two compartments, the waste-packing in one of said compartments, the oil-cup, the face of the hub being formed with oil-openings, substantially as described.

In testimony whereof I affix my signature in presence of two witnesses.

JOHN V. HAWKEY.

Witnesses:
JOHN GROETZINGER,
GEORGE WILSON.